US010130217B2

(12) United States Patent
Rambo

(10) Patent No.: US 10,130,217 B2
(45) Date of Patent: Nov. 20, 2018

(54) NUT CRACKER WITH MECHANICAL ADVANTAGE

(71) Applicant: Nutdemander, LLC, Croton, OH (US)

(72) Inventor: Jerry P. Rambo, Croton, OH (US)

(*) Notice: Subject to any disclaimer, the term of this patent is extended or adjusted under 35 U.S.C. 154(b) by 11 days.

(21) Appl. No.: 15/144,042

(22) Filed: May 2, 2016

(65) Prior Publication Data

US 2016/0316974 A1    Nov. 3, 2016

Related U.S. Application Data

(60) Provisional application No. 62/155,564, filed on May 1, 2015.

(51) Int. Cl.
  *A47J 43/26* (2006.01)
  *A23N 5/00* (2006.01)
  *A47J 43/00* (2006.01)

(52) U.S. Cl.
  CPC .............. *A47J 43/26* (2013.01); *A23N 5/00* (2013.01); *A47J 43/00* (2013.01)

(58) Field of Classification Search
  CPC .............. A47J 43/26; A47J 43/00; A23N 5/00
  See application file for complete search history.

(56) References Cited

U.S. PATENT DOCUMENTS 2,405,303 A * 8/1946 Grupe ................... A23N 5/004
                                                          99/577

FOREIGN PATENT DOCUMENTS

| DE | 19713109 |   | 9/1998 |
|----|----------|---|--------|
| EP | 0667112  |   | 8/1995 |
| GB | 183238   | * | 7/1922 |

* cited by examiner

*Primary Examiner* — Anthony J Weier
(74) *Attorney, Agent, or Firm* — Jason H. Foster; Kremblas & Foster

(57) ABSTRACT

A nut cracking device with a frame having elongated, parallel members that surround a mechanical advantage device, such as a hydraulic jack. Top and bottom channel members are mounted at opposite ends of the frame members to separate the frame members and form a rigid frame structure. An anvil with texture to reduce slipping and increase pressure is mounted to the top member and extends toward the jack, on which a table is mounted. A nut may be placed on the table. Upon displacement of the jack's shaft, the table moves toward the anvil and any nut on the table is clamped, and ultimately fractured, between the table and the anvil. A hand-grippable knob permits manual bypass of a valve to permit the table to be pulled away from the anvil by springs mounted to the table.

7 Claims, 5 Drawing Sheets

NUT CRACKER WITH MECHANICAL ADVANTAGE

CROSS-REFERENCES TO RELATED APPLICATIONS

This application claims the benefit of U.S. Provisional Application No. 62/155,564 filed May 1, 2015. The prior application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates broadly to the field of nut cracking devices, and more particularly to a device that uses mechanical advantage and other features to make the cracking of nuts easier and safer.

It is well known that consumable nuts have a hard shell that must be opened in order to remove the nut seed, which is also referred to as the "flesh", "nut" and/or "meat". Examples include English and black walnuts, pecans, Brazil nuts, almonds, hazelnuts and more. The hard outer shell may be broken, shattered, pried apart or otherwise separated from the seed in order to consume the seed.

Most humans cannot remove nut shells with their bare hands, with the common exception of peanuts. Therefore, most nuts require one to use some form of tool to remove the shell. Some existing tools for removing the shell of a nut are simple, such as the nut pick, which is a sharpened rod, and the pliers-like nutcracker. The latter tool has two handles that are hingedly attached at adjacent ends to one another or to a third member that separates the two handles by about one inch. In both examples, such a conventional nutcracker uses the force applied by the user's hand(s) to crush the shell, at which point the user may remove the seed from the shell. No mechanical advantage is available from the pliers-like nutcracker other than small leverage.

Common nuts are so hard that many people cannot generate sufficient force to break the shells even with conventional nut cracking tools. For example, black walnuts have an unusually hard outer shell that makes breaking the shells extremely difficult, particularly if one wishes to salvage the seed in a relatively intact condition.

The need exists for a nut cracking device that permits an average person to crack a hard-shelled nut while maintaining the contents thereof intact.

BRIEF SUMMARY OF THE INVENTION

Disclosed herein is an object clamping apparatus that is superior to others because of its ease of use, portability and light weight. Because of power multiplication through the use of hydraulic or other mechanical force advantage systems, simplification of use and repeatability, the disclosed device is safer, faster and more durable than any other known to the inventor.

The object clamping apparatus comprises a frame having a plurality of perimeter members and a top member rigidly mounted to the perimeter members. An anvil is mounted to the top member and has a proximal face that faces away from the top member. A linear prime mover, which may be a hydraulic bottle jack, has a moveable member configured to move through a linear path substantially parallel to the perimeter members and ending at the anvil's proximal face. A table is mounted to the moveable member and configured to move relative to the anvil along the linear path restrained laterally within the perimeter members. The table has a first surface that faces the proximal face of the anvil and a second surface that faces away from the proximal face of the anvil.

In a preferred embodiment, at least one spring is mounted to the second surface of the table to elongate upon the table traversing toward the anvil. This elongated at least one spring applies a force to the table that tends to displace the table away from the anvil. When a valve is bypassed in the prime mover, the force applied by the spring may displace the table away from the anvil. A hand-grippable knob may be mounted to a valve to rotate the knob and thereby bypass the valve. The proximal face of the anvil may have transverse grooves formed therein that define pins that protrude toward the first face of the table. These grooves defining pins reduce movement of the nut laterally, which is along the plane of the table and toward the perimeter members from an axis of the anvil.

Disclosed herein is a nut cracking method that includes a step of resting a nut upon a table mounted to a prime mover. The prime mover may be configured to move the table through a path substantially parallel to first, second, third and fourth substantially parallel perimeter members. The perimeter members may be components of a frame and spaced apart with a top member rigidly mounted to the perimeter members and extending therebetween. The prime mover is actuated to thereby displace the table through the path toward an anvil mounted to the top member. The anvil has a proximal face at one end of the path. The nut is clamped between the table and the anvil's proximal face with a force applied by the prime mover sufficient to fracture a nut shell. The table is then displaced away from the anvil, possibly by springs elongated when the table moved toward the anvil, and the nut is removed from the table.

In a preferred embodiment, the step of actuating the prime mover further comprises reciprocating a handle through a path, such as in an up-and-down movement. The step of displacing the table may further comprise manually rotating a knob to bypass a valve to permit at least one spring mounted to the table to draw the table away from the anvil.

Figure 1:
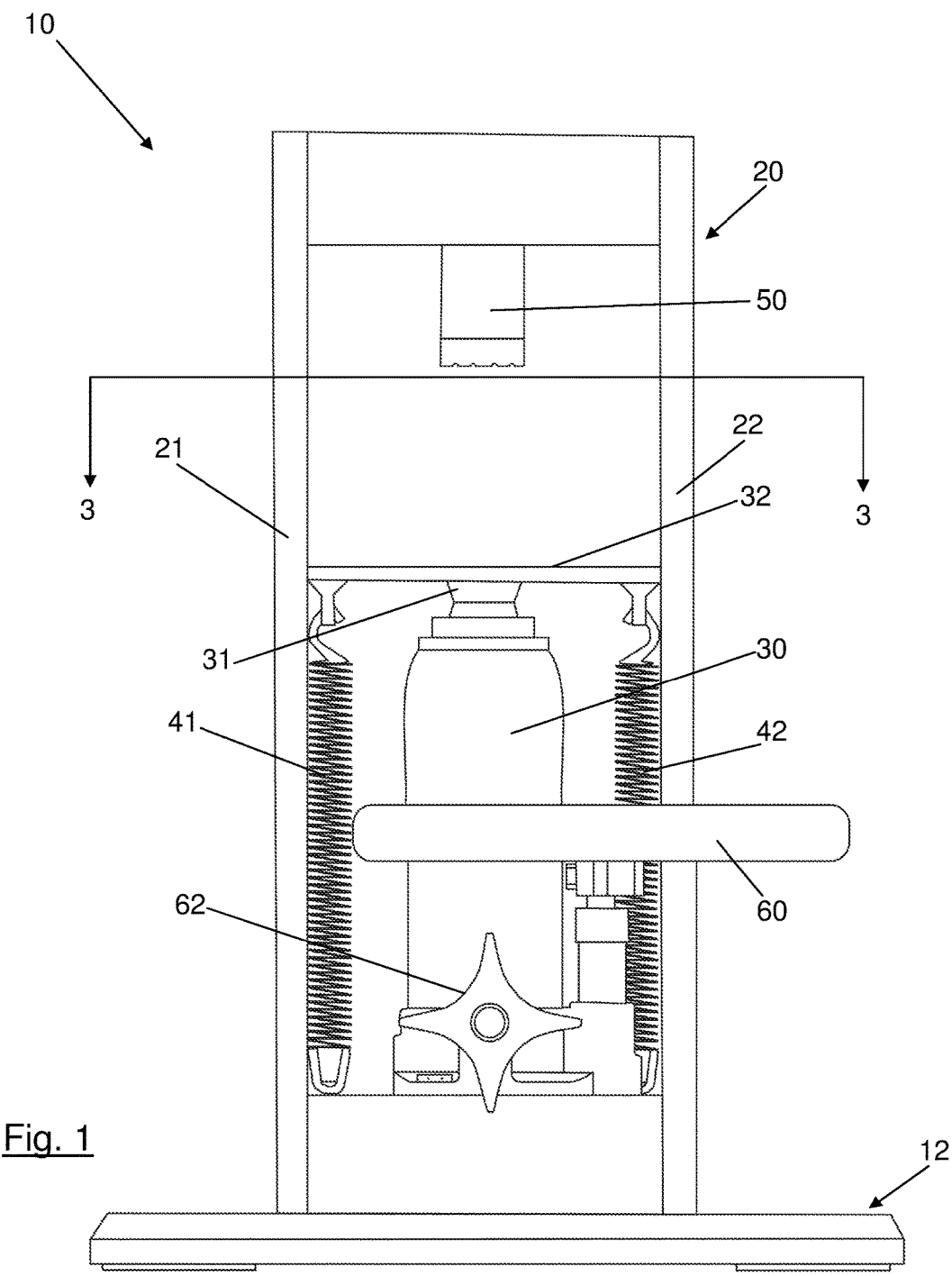
FIG. 1 is a front view illustrating an embodiment of the present invention.
Figure 2:
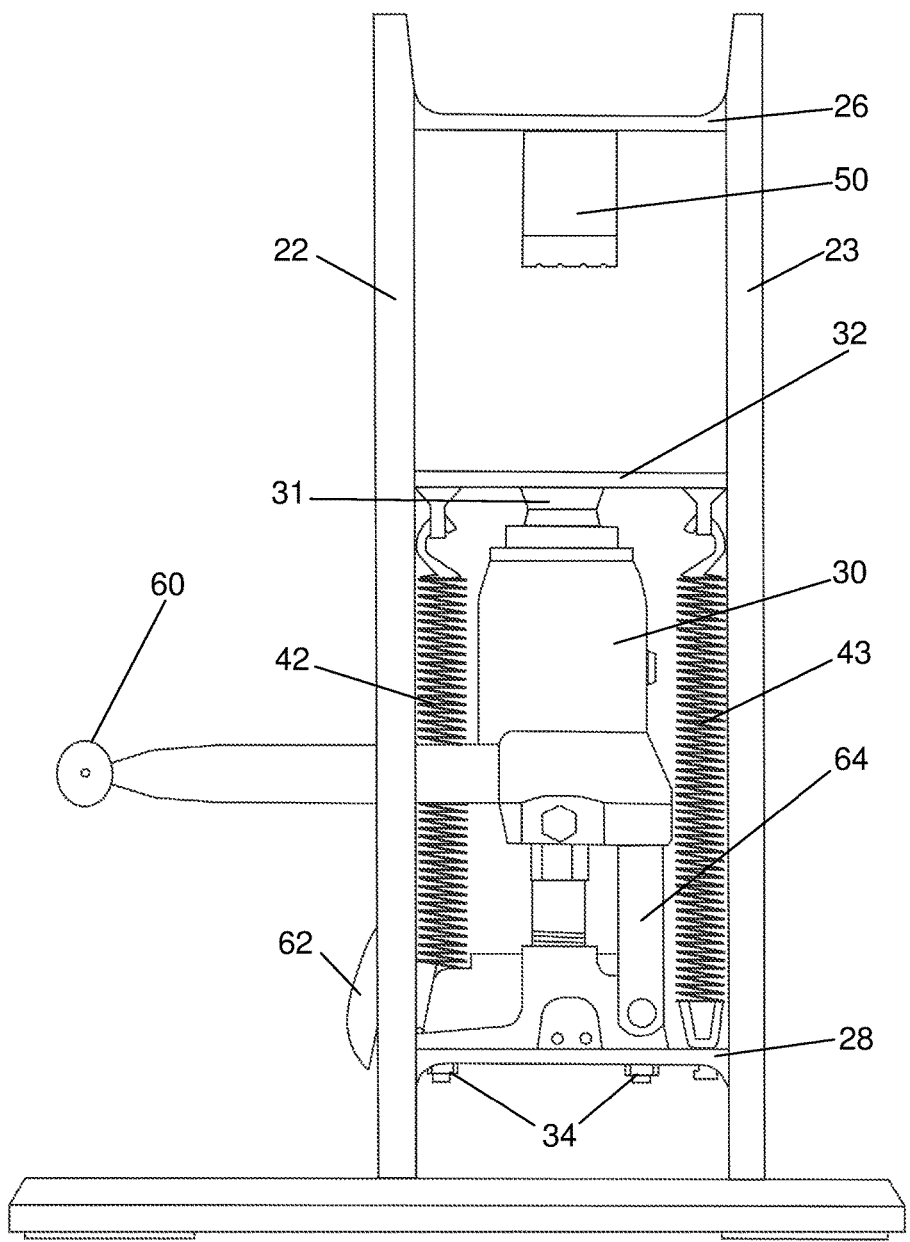
FIG. 2 is a right side view illustrating the embodiment of FIG. 1.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Patent application Ser. No. 62/155,564 is incorporated in this application by reference.

An embodiment of the present invention is illustrated in FIGS. 1-5. The nut cracker 10 has a base 12 to which a frame 20 is mounted. Although the base 12 may be made of decorative wood, it is contemplated that the base 12 and all other structures may be made of metal, such as common steel, unless noted otherwise. The base 12 may be made of an attractive and strong wood panel that is 0.75 inches thick by one foot wide by one foot long. The wood may have a decorative profile along the edge, and the frame 20 may be mounted near the center of the base 12.

Four perimeter members, such as the corner posts 21, 22, 23 and 24, are components of the frame 20 that are connected, such as by weldments at abutting surfaces, to a top frame member, such as the top channel 26, and a bottom frame member, such as the base channel 28. The corner posts 21-24 form the lateral perimeter of the frame 20, may be L-shaped in cross section, and may be mounted at their lower ends (in operable orientation shown in FIGS. 1-4) to the base 12. The top channel 26 and the base channel 28 may be steel C-channel, but other structures may be substituted, and the top channel 26 and base 12 form the upper and lower boundaries of the frame 20. This construction provides a rigid frame 20 that a person of ordinary skill will understand is very strong.

The base 12 is preferably mounted to the underside of the frame 20, such as by nut, screw and washer combinations 16 (see FIG. 4) extending through the base 12 into the ends of the corner posts 21-24. Anti-slip foot pads 14, which may be rubber, felt or other soft materials, may be mounted at corners of the base 12 to reduce lateral slipping and protect from scratching the surface upon which the device is placed.

A prime mover, such as a hydraulic bottle jack 30, is rigidly mounted to the base channel 28, preferably with removable fasteners, such as bolt and nut combinations 34, but alternatively using substantially non-removable fasteners, such as rivets or weldments. A preferably rectangular table 32 is disposed directly above the jack 30 (in operable orientation shown in FIGS. 1-4) and may attach to the end of the jack's shaft 31. The attachment may be permanent, such as a weldment, or removable, such as a screw. The table 32 may be made of stainless steel plate about one-quarter inch thick.

Figure 3:
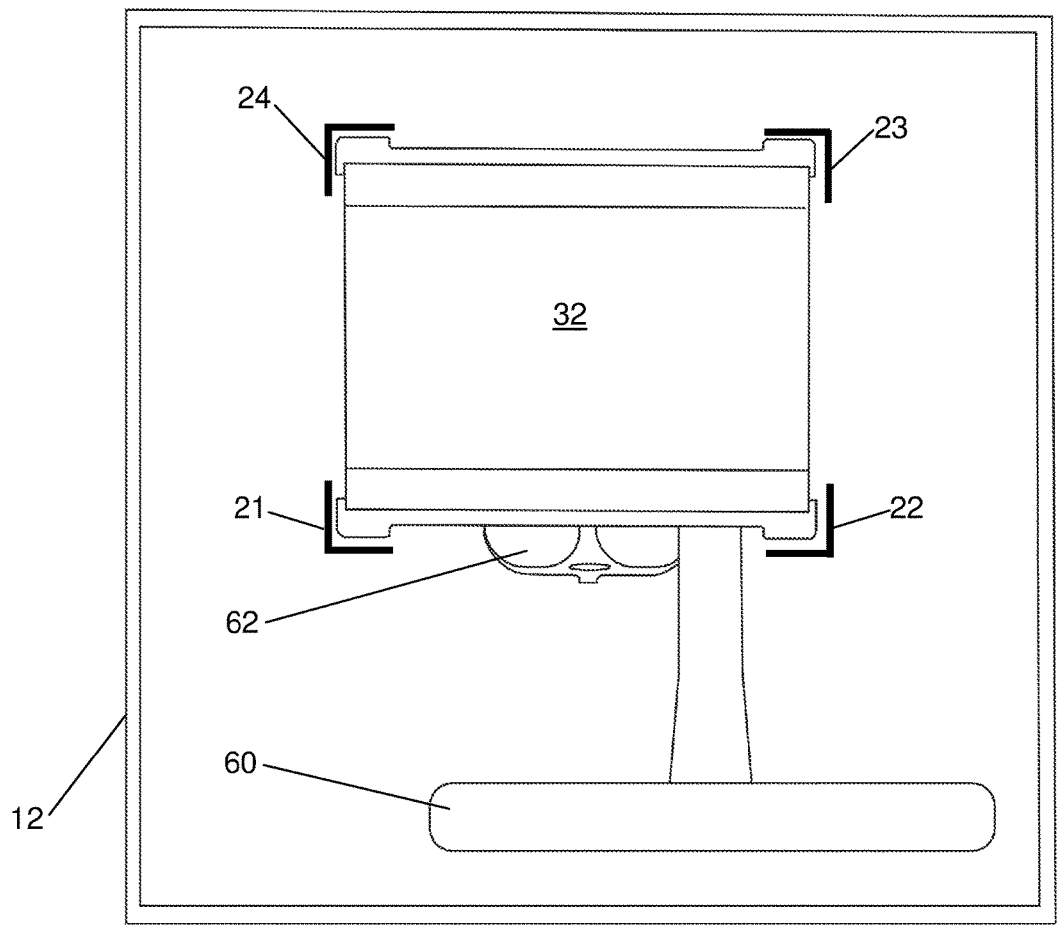
FIG. 3 is a top section view illustrating the embodiment of FIG. 1 through the line 3-3.
Figure 4:
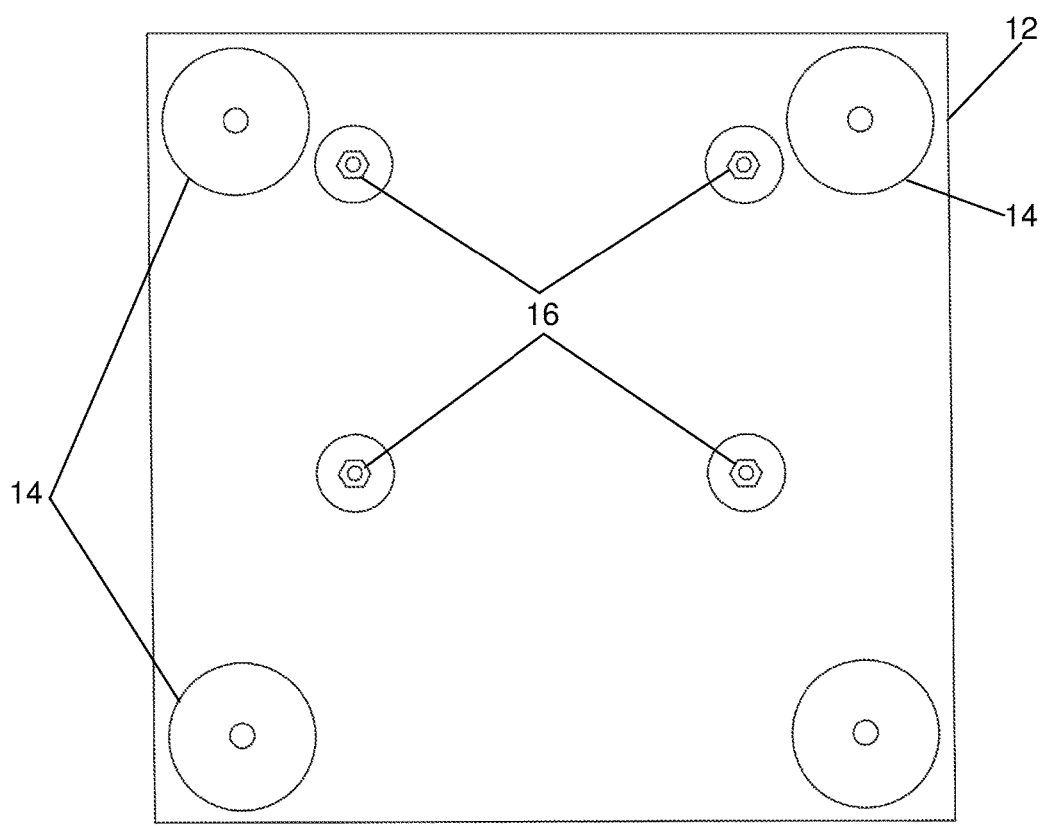
FIG. 4 is a bottom view illustrating the embodiment of FIG. 1.

The table 32 is limited in lateral movement transverse to the posts 21-24 by the respective corners of the table 32 being seated against or disposed closely-adjacent the posts 21-24, which may be angled (L-shaped in perpendicular section) steel members. Each corner of the table 32 inserts into a respective inwardly-facing groove of one of the posts 21-24 as shown in FIG. 3. Thus, the grooves guide the table 32 as it is translated along the vertical path as driven by the jack 30, and as described in more detail below.

Four springs 41, 42, 43, and 44 (not shown), which are preferably coil springs but could be any equivalent, suitable biases, are mounted at a lower spring end to the base channel 28 and at an opposite, upper end to the underside (in the orientation shown in FIGS. 1-2) of the table 32. Preferably, multiple spring bases are welded to the lower surface of the table 32, the spring bases are spaced evenly around the shaft 31, and the upper ends of the springs 41-44 mount thereto. Thus, the springs 41-44 bias the table 32 downwardly once the springs 41-44 begin to elongate after the table 32 is moved upwardly from the position shown in FIG. 1. Once elongated, the springs 41-44 tend to return the table 32 to its position shown in FIG. 1 unless a sufficient force, which may be exerted by the jack 30, maintains the table 32 at a more upward position. The springs 41-44 may be replaced by gas, magnetic, leaf, elastomeric or any other suitable springs.

A preferably stainless steel, circular cylindrical anvil 50 is mounted to the underside of the top channel 26, preferably directly above the table 32, and extends directly toward the table 32. The anvil 50 is preferably centered between the posts 21-24 above the table 32 with the longitudinal axis of the shaft 31 of the jack 30 coincident with the longitudinal axis of the anvil 50. An upwardly-directed force may be applied to the table 32 by the shaft 31 and this force will be centered on the axis of the anvil 50. The anvil 50 may be about 1.5 inches in diameter and about three inches long, but these are not critical dimensions.

Figure 5:
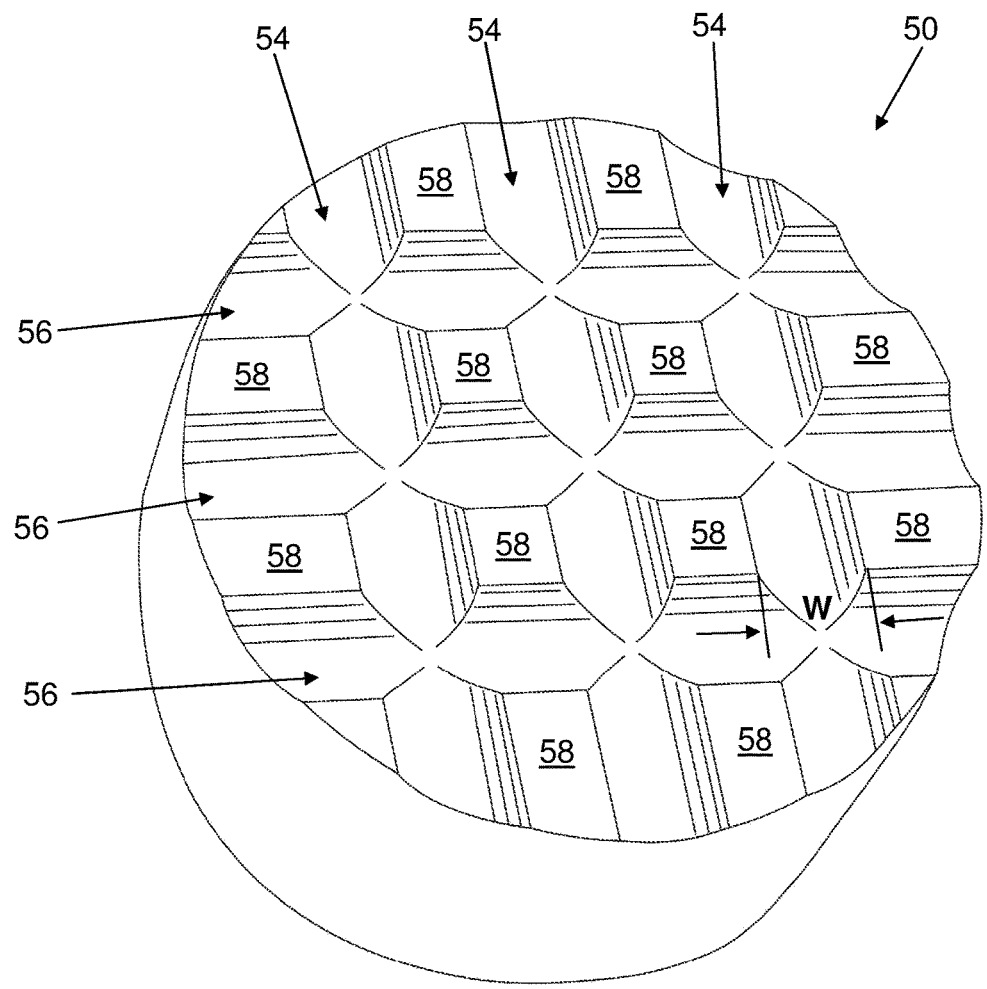
FIG. 5 is a view in perspective illustrating the cross-hatched surfaces of an anvil.

The proximal surface 51 of the anvil 50 that faces the table 32 is preferably substantially parallel to the table 32, and has surface formations that increase the resistance to nuts or other crushable objects sliding laterally relative to the anvil 50 surface. The surface formations are preferably cross-hatching shown in FIG. 5, which may be made by forming multiple parallel primary cuts 54 in the face of the anvil 50 centered at about every one-half inch, and then forming multiple parallel secondary cuts 56 in the face of the anvil 50 centered at about every one-half inch. The primary cuts 54 are transverse, and preferably perpendicular, to the secondary cuts 56. The cuts 54 and 56 may be about one-eighth of an inch deep into the anvil's 50 length and about one-quarter of an inch wide (W) across the anvil's width, as shown in FIG. 5.

The cross-hatching forms a concentration of force due to increased pressure arising from lowered contact area at the proximal face in comparison to a planar surface. In a preferred embodiment in which there are perpendicular cuts 54 and 56, the formation thereby of pins 58 protruding toward the table 32, the cross-hatching configuration resists movement in any lateral direction.

The handle 60 is attached to the hydraulic pumping mechanism of the jack 30 via a parallel linkage 64. The handle 60 mounts to the jack 30 in a conventional manner to permit pumping of hydraulic fluid from a reservoir into a chamber within the jack's housing. None of the mechanisms within the jack 30 is visible in the illustrations, but they are conventional to bottle jacks. The hand-grippable knob 62 is mounted to a conventional bypass to bypass and engage a one-way valve between the chamber and the reservoir. When the knob 62 is rotated in one direction to engage the one-way valve (the "raised" position), such as in the clockwise direction, reciprocation of the handle 60 causes the shaft 31 and table 32 to be translated vertically in the orientation shown in FIGS. 1-4. This occurs by the movement of a small piston displacing a small quantity of fluid into the larger chamber in which a much larger piston (to which the jack's shaft 31 is mounted) is disposed. The handle 60 is limited to travel through a vertical path, and with each "up" stroke a piston draws liquid from the integral case reservoir. This draws the liquid into the jack pump cylinder which, on the handle 60 "down" stroke, forces the jack piston and shaft 31 upward, thereby raising the preferably stainless steel table 32, such as by one millimeter or a similar small distance. Reciprocation of the handle 60 through its path of travel causes the shaft 31 to progress upwardly away from the jack's case.

When the knob 62 is rotated in the opposite, for example the counter-clockwise, direction to the "lowered" position, this opens a hydraulic bypass to permit any downward forces exerted on the table 32 by the springs 41-44 to force the table 32, shaft 31 and large piston downwardly by pushing fluid in the opposite direction back into the reservoir from the large chamber. Rotating the knob 62 to the raised position and tightening it there allows the nut-cracking process to be started again.

The process of using the nut cracker 10 will now be described. The raise/lower knob 62 is preferably turned clockwise until tightened. A hard shell nut, such as a black walnut, may be wrapped in a cloth, bag or other flexible container to keep shell pieces together during the fracturing process. The nut may be left uncovered, but this is not recommended. The nut and possibly the container are placed on the table 32, preferably centered on an imaginary line that extends through the coincident axes of the anvil 50 and the shaft 31. The handle 60 is next moved up and down in a reciprocating motion, thereby causing the table 32 on top of the shaft 31 to be raised.

The table 32 attached to the top of the shaft 31 is guided by the four corner posts 21-24 to maintain positive lateral, rotational and horizontal alignment as the table 32 traverses the vertical path toward the anvil 50. As described above, this path is limited horizontally by the corner posts 21-24. Each down stroke of the handle 60 raises the piston shaft 31 and the connected table 32 towards the fixed anvil 50. The vertical travel of the shaft 31 displaces the wrapped nut on the table 32 toward the anvil 50. Once the cloth-wrapped nut shell contacts the anvil 50, pressure and resistance increase with each stroke of the handle 60 until nut shell fracture occurs while clamping the nut between the anvil 50 and the table 32. Pressure multiplication is achieved with each downward stroke of the handle 60.

Shell failure is audibly and/or tactilely noticeable to the user, and the person of ordinary skill will understand that additional, further fracture may be desired. Due to the failure of the nutshell there is an immediate pressure drop due to lack of resistance. The table 32 may now be lowered slightly to further fracture the nut by turning the raise/lower knob 62 in the opposite direction, which is preferably counter clockwise ("lower position") for a short period of time, such as a fraction of a second. The table 32 is pulled away from the anvil 50 by the springs 41-44, which elongated as the table was first displaced toward the anvil 50. After the knob 62 is rotated in the clockwise direction until tight, a few pumps of the handle 60 are all that is necessary for further clamping of the nut in a different position between the table 32 and the anvil 50, and subsequent fracture. Once the nut shell has been sufficiently fractured, the knob 62 is rotated counter-clockwise sufficiently to allow the now elongated springs 41-44 to lower the table 32. This process can be repeated many times until the table 32 may be lowered back to the position shown in FIG. 1. The lowered table 32 now facilitates removal of the possibly cloth-wrapped, fractured nut. The nutcracker apparatus is now ready to repeat the process once the knob 62 is returned to the "raise" position.

It will be understood by the person having ordinary skill that the bottle jack 30 is not the only prime mover that may move the table 32 relative to the anvil 50. The bottle jack 30 may be replaced by another prime mover that provides mechanical advantage to permit an average person to displace the table 32, such as a linear motor, a screw jack, a compound lever, a pneumatic ram or any other suitable linear prime mover. Furthermore, any lateral guidance apparatus may be substituted for the posts 21-24. One alternative may include parallel perimeter members mounted in slots formed in the edges of the table 32.

The person having ordinary skill will understand that components of the invention can be replaced by other, equivalent components. For example, the entire product could be made of wood, plastic or other materials. Alternatively, the entire design may be inverted so that the anvil is on the jack above the table. In such a case, the terms "top channel", "top member" and similar terms are not limited to being at the top of a structure. These terms are simply used in relation to the preferred embodiment with the understanding that such structures can be inverted and used in different combinations to accomplish a similar purpose.

It will also be understood that the texture on the proximal face of the anvil is not limited to the cross-hatching shown and described. The person having ordinary skill will understand from the description herein that textures may be formed by casting, machining, chemical etching and many other methods. Furthermore, textures may be formed as transverse grooves, but may also be formed in other patterns. For example, circular grooves, triangular grooves, randomly formed grooves may be acceptable. Still further, raised structure having no pattern may be acceptable.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An object clamping apparatus comprising:
   (a) a frame having a plurality of perimeter members and a top member rigidly mounted to the perimeter members;
   (b) an anvil mounted to the top member, the anvil having a proximal face facing away from the top member;
   (c) a linear prime mover having a moveable member configured to move through a path substantially parallel to the perimeter members and defined at one end by the proximal face;
   (d) a table mounted to the moveable member and configured to move relative to the anvil along the path restrained laterally within the perimeter members, the table having a first surface that faces the proximal face of the anvil and a second surface that faces away from the proximal face of the anvil; and
   (e) at least one spring mounted to the second surface of the table and to the frame.

2. The object clamping apparatus in accordance with claim 1, wherein the proximal face of the anvil has transverse grooves formed therein that form pins that protrude toward the first face of the table.

3. A nut cracking apparatus comprising:
(a) a frame including first, second, third and fourth substantially parallel perimeter members spaced apart and a top member rigidly mounted to the perimeter members and extending therebetween;
(b) an anvil mounted to the top member, the anvil having a proximal face facing away from the top member and the anvil disposed at one end of a path substantially parallel to the perimeter members;
(c) a hydraulic bottle jack mounted between, and having a shaft configured to move through the path;
(d) a table mounted to the shaft and configured to move relative to the anvil along the path restrained laterally within the perimeter members, the table having a first surface that faces the proximal face of the anvil and that is configured to rest a nut upon and a second surface that faces away from the proximal face of the anvil; and
(e) at least one spring mounted to the second surface of the table.

4. The nut cracking apparatus in accordance with claim 3, wherein the proximal face of the anvil has transverse grooves formed therein that form pins that protrude toward the first face of the table.

5. The nut cracking apparatus in accordance with claim 3, wherein the hydraulic bottle jack has a handle that is moveable through a handle path to displace the shaft.

6. The nut cracking apparatus in accordance with claim 5, further comprising a hand-grippable knob mounted to a bypass that may bypass a one-way valve.

7. The nut cracking apparatus in accordance with claim 6, further comprising a base mounted to the bottom of the frame.

* * * * *